May 24, 1932.    J. SCHLAGENHAUF    1,859,534
COUPLING FOR TRAILERS
Filed Jan. 17, 1930

Inventor
Johann Schlagenhauf
By B. Singer, Atty.

Patented May 24, 1932

1,859,534

UNITED STATES PATENT OFFICE

JOHANN SCHLAGENHAUF, OF OERLIKON, NEAR ZURICH, SWITZERLAND

COUPLING FOR TRAILERS

Application filed January 17, 1930, Serial No. 421,498, and in Switzerland January 26, 1929.

The present invention relates to a coupling for trailers used on roads, tramways, railways, etc. Couplings are known wherein an eye provided on the main vehicle is passed into a guide of the trailer and secured in this by a bolt which is set in the securing position when the vehicles collide for example, by means of springs which are released when the vehicles meet. The known couplings of this type have the disadvantage that when the vehicles pass around curves the coupling parts are subjected to considerable strain which easily leads to damage of the coupling.

The object of the present invention is to eliminate this disadvantage and this is effected in that the guide piece receiving the eye of the main vehicle is pivotally mounted so that the guide affords an efficient and secure guide for the eye when coupling until the locking bolt has completed the coupling. The strains which occur in the known couplings are eliminated in this case without in any way thereby reducing the efficient guiding of the parts to be coupled together.

In the accompanying drawings are illustrated examples of construction.

Figure 1:
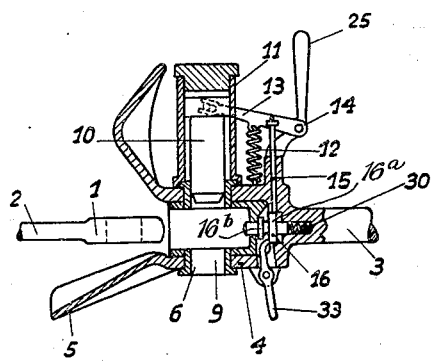
Fig. 1 shows a vertical section of the coupling parts.
Figure 2:
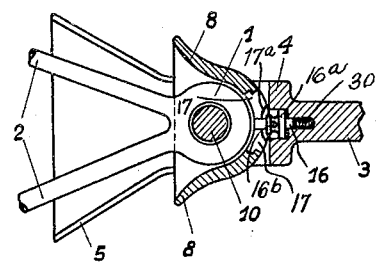
Fig. 2 shows a horizontal section thereof.
Figure 3:
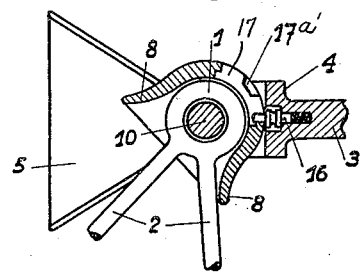
Fig. 3 shows the coupling according to Figs. 1 and 2 when negotiating a curve.

To the draft vehicle there is secured in the known manner by means of a rod 2 an eye 1, whilst to the trailer there is secured by means of the rod 3 a guide member 4 which at the front passes into a downwardly inclined widened guide wall 5. The guide 4 is provided with a central hole into which is fitted a bush 6. On this is mounted a guide bell 8 adapted to receive the eye 1. The said bell is semicircular in plan and is flared and widened at its open side or mouth so that the head or eye 1 of the rod 2 is guided into the bell and centered or arranged concentrically therein as shown in Figs. 2 and 3. The dimensions of the bell 8 are so large that the eye 1 finds room therein and when the eye 1 has completely entered the bell the hole in the eye coincides with the bore 9 of the bush 6. Said bush as will be noted on Fig. 1, forms the pivot of the bell 8 and keeps the latter always centered whether in coupled or uncoupled condition. For coupling the two vehicles there is provided a bolt 10, slidably mounted in a casing 11 provided on the guide member 4. To the bolt is connected a lever 13, subjected to the action of a spring 12, which lever is pivoted to the guide member 4 by means of a pin 14. The spring 12 tends to move the bolt 10 downwardly into the eye 1. For securing the bolt 10 in the position shown in Fig. 1 there is provided a pin 15, which is mounted for vertical movement in a bore of the element 3 and the lower end of which bears on a bolt 16. Said bolt has an annular diametrically enlarged flange 16a and also has a stop flange 16b of less diameter than flange 16a and spaced from the front side thereof. Said bolt 16 is slidably mounted in a hole of the guide 4 and is under the action of a spring 30 tending to press the bolt outwardly. The front end of the locking bolt 16 enters a slot 17 of the bell 8 and the flange 16b is adapted to enter a notch 17a in the rear side of the element 8 to lock the latter in the position indicated in Figs. 1 and 2. When the eye 1, on coupling the vehicles, meets the end of the bolt 16, projecting into the interior of the bell, the bolt is moved against the action of the spring 30. A groove between the flanges 16a, 16b thus brought into the path of the pin 15. The spring 12 can now contract and by means of the lever 13 moves the coupling bolt 10 downwardly into the hole of the eye 1, both vehicles being now coupled together. When negotiating a curve the eye 1 moves for example as shown in Fig. 3. It takes with it the bell 8 and the coupling members are not strained so that the coupling parts are not liable to be damaged.

The bolt 10 remains secured in its position outside the eye as the pin 15 bears on the bolt 16 so that the spring 12 cannot expand. When uncoupling the vehicle the bolt 10 may be raised by means of the handle 25, the bolt 16 then immediately turning back into its locking position for the lever 13 under the action of the spring acting thereon.

I provide a hand lever 33 pivoted in the guide 4 by means of which the bolt 16 can be moved against the action of the spring 30. By the lever 33 the bolt 10 may be released even if the eye 1 does not reach up to the face of bolt 16. The eye of a hawser or the like may be introduced into the guide bell 8 by hand and coupled to rod 3 by the bolt 10.

What I claim by U. S. Letters Patent is:

1. In a trailer coupling, a coupling head, a receiving bell for a link pivotally mounted in the said coupling head, a bolt slidably mounted on said head adapted to pass through the center of the bell, means to operate said bolt, said means comprising a spring operated lever, a pin supporting said lever against the action of the spring, a member slidably mounted in the said coupling head securing said receiving bell, and projecting into the same and adapted to retain said supporting pin in initial uncoupled position.

2. In a trailer coupling, a coupling head, a receiving bell for a link pivotally mounted in the said coupling head, a bolt slidably mounted on said head adapted to pass through the center of the bell, means to operate said bolt, said means comprising a spring operated lever, a pin supporting said lever against the action of the spring, a member slidably mounted in the said coupling head, securing said receiving bell, and projecting into the same and adapted to retain said supporting pin in initial uncoupled position and a manually operated lever adapted to operate said member.

In testimony whereof I affix my signature.

JOHANN SCHLAGENHAUF.